July 18, 1950 A. L. PRESTON 2,515,836
APPARATUS FOR HOLDING AND VAPORIZING LIQUEFIED GASES
Filed Jan. 23, 1946 3 Sheets-Sheet 2

INVENTOR
ALBERT L. PRESTON
BY
ATTORNEY

July 18, 1950            A. L. PRESTON            2,515,836
APPARATUS FOR HOLDING AND VAPORIZING LIQUEFIED GASES
Filed Jan. 23, 1946                            3 Sheets—Sheet 3
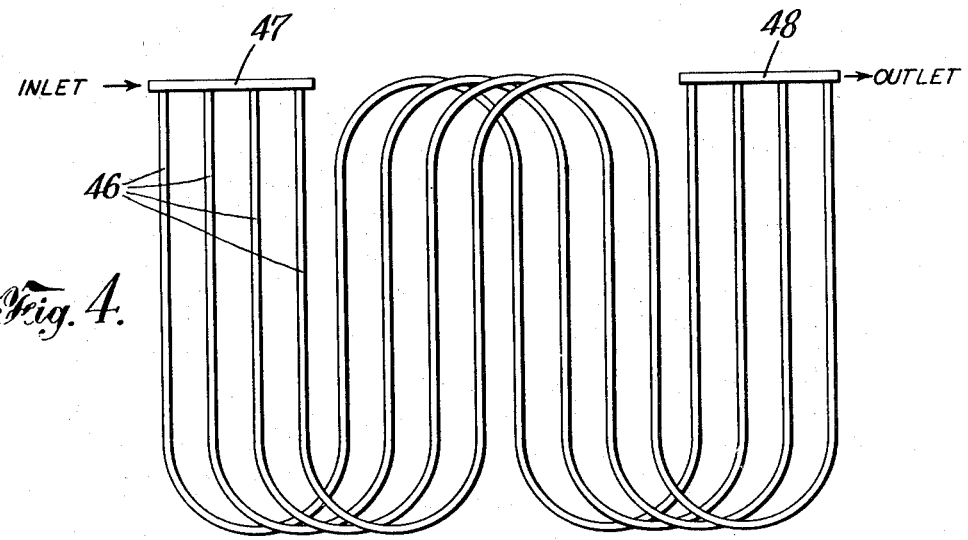
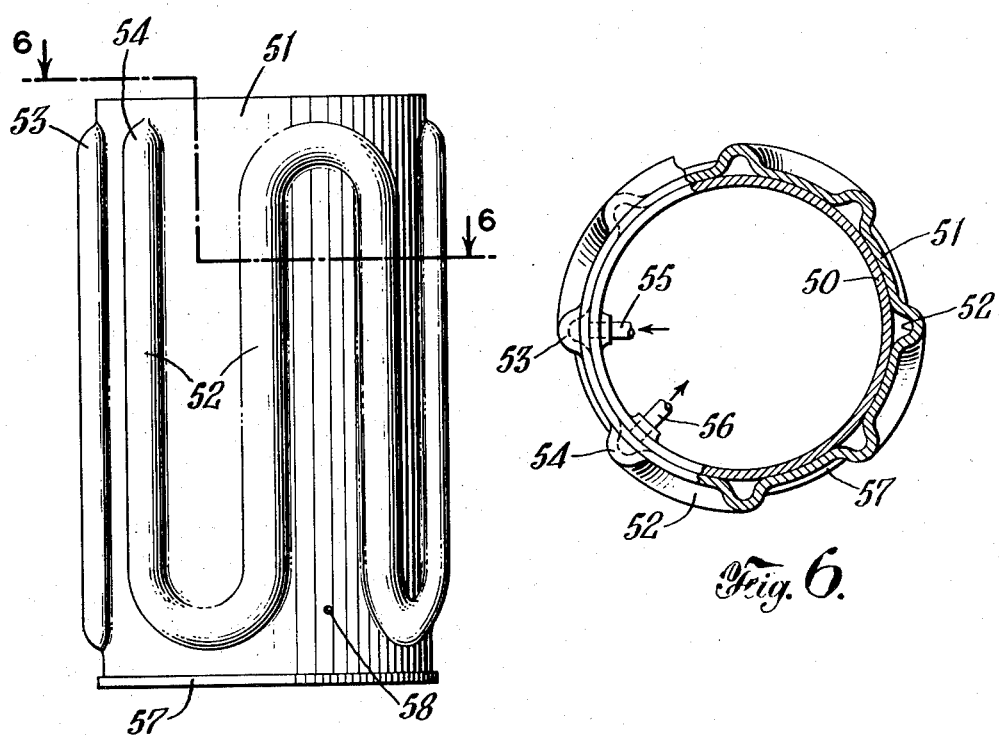
INVENTOR
ALBERT L. PRESTON
BY
ATTORNEY Patented July 18, 1950

2,515,836

UNITED STATES PATENT OFFICE 2,515,836

APPARATUS FOR HOLDING AND VAPORIZING LIQUEFIED GASES

Albert L. Preston, Kenmore, N. Y., assignor to The Linde Air Products Company, a corporation of Ohio Application January 23, 1946, Serial No. 642,820

9 Claims. (Cl. 62—1)

This invention relates to apparatus for holding and vaporizing liquefied gases and more particularly to an improved equipment for holding and vaporizing liquid oxygen and supplying gaseous oxygen under a suitable pressure and temperature to a distributing system or to occupants of an aircraft for breathing purposes.

Customary apparatus for storing and vaporizing liquefied gas generally consists of a heavy pressure vessel surrounded by a thick layer of insulation and having complicated apparatus associated therewith for vaporizing and heating portions of the stored liquid under pressure to supply gas as needed by consuming devices. For providing additional oxygen aboard aircraft, it has been proposed to carry a supply of liquid oxygen in a container having a vaporizing device which can be operated to supply gaseous oxygen when required and at the rate needed. By carrying the oxygen in liquid form a larger quantity of oxygen can be carried for a given total weight of container and contents than if the oxygen were carried in compressed gaseous form in high pressure heavy cylinders.

In the operation of such an apparatus it is desirable that during periods of no demand for gas the amount of liquid oxygen vaporized due to heat leak thereto from external sources should be a minimum. It is also essential that the weight of the apparatus should be low, that the gasification should occur only when gas is needed and at the rate required, that no liquid oxygen should reach the gas utilizing equipment, and that the gaseous oxygen produced should be warmed to a temperature not greatly different than the atmospheric temperature so that it will be at a suitable temperature for breathing. When employed in aircraft the apparatus should also be capable of operation in various positions and, although of light weight, the apparatus should be safe, simple to operate and not easily damaged.

The principal objects of the invention are to provide improved apparatus for vaporizing liquefied gases, such as oxygen, and for warming or superheating the vapor to provide gaseous oxygen at a temperature and pressure suitable for use; to provide such an apparatus which is light, which may be operated in various positions, and which is protected from injury and is simple to operate.

Further objects of the invention are to provide such an apparatus in which the inner liquid holding vessel is adequately supported in any position so that it will safely withstand forces due to acceleration in various directions when loaded; to provide a container supporting structure which in addition to providing support also functions as a gas superheater and as a protective shield to eliminate the need for and weight of separate elements for superheating the gas and for protecting the container.

The above and other objects and novel features of the invention will become apparent from the following description, having reference to the annexed drawings, wherein:

Fig. 4 is a developed view of an alternative construction of superheater;

Fig. 5 is an elevational view of still another form of superheater and support; and Fig. 6 is a top view of a partial section taken on the line 6—6 of Fig. 5.

Figure 1:
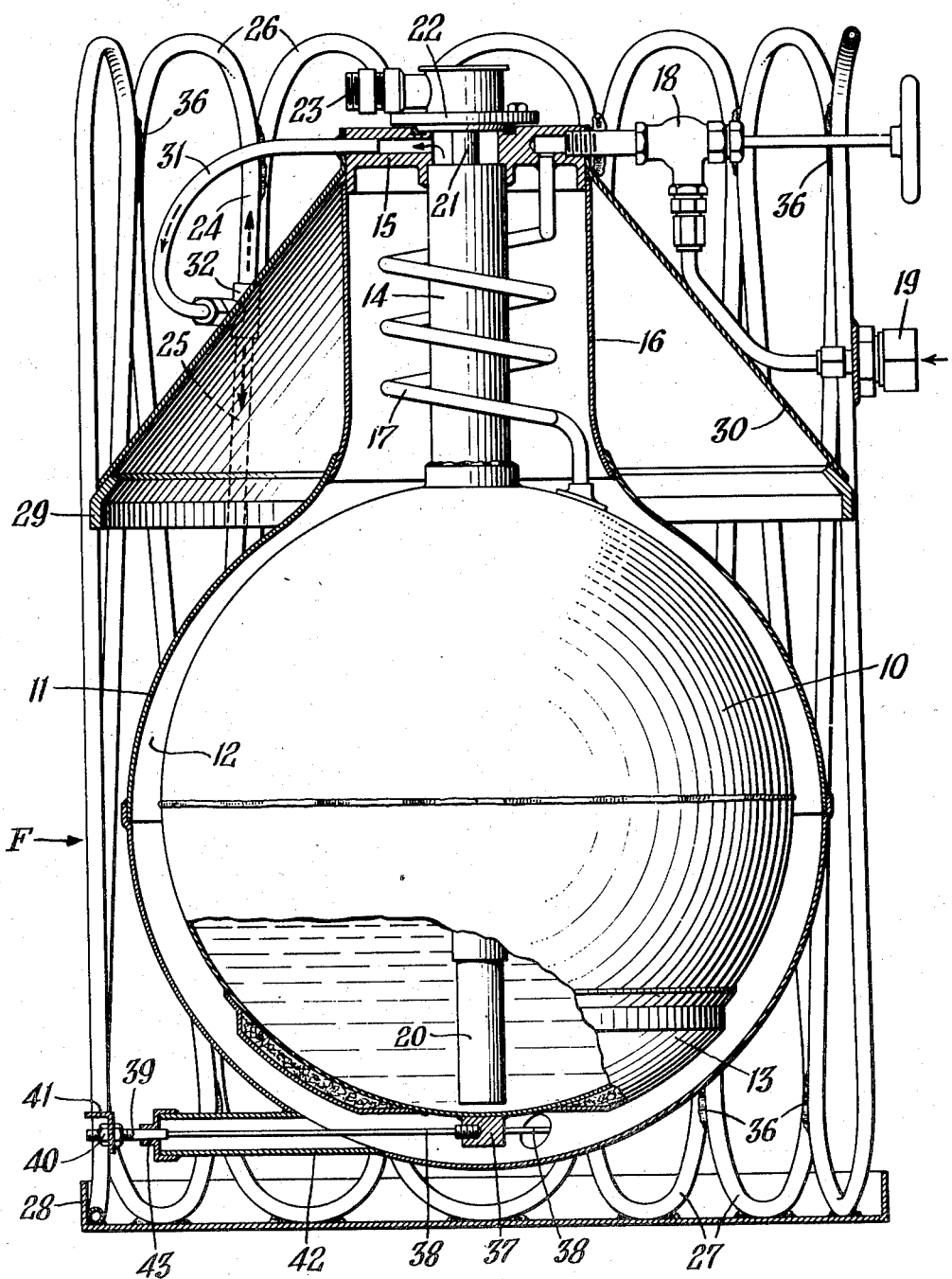
Fig. 1 is a view, mainly in vertical section, of an apparatus for holding and vaporizing liquefied gas according to the invention.

Referring now to the drawings and particularly to Fig. 1, the apparatus includes an inner vessel 10, which is preferably of spherical shape, since such shape will provide a minimum wall thickness and weight of metal for a given volume of contents. Other shapes such as cylindrical would also be suitable. The wall thickness is chosen so that the vessel withstands a working pressure equal to the supply pressure of gaseous oxygen to the consuming apparatus, for example, about 65 p. s. i. gauge. The inner vessel 10 is surrounded by any suitable insulation means that preferably includes an outer jacket 11, which is spaced a small distance from the inner vessel to provide an insulating space 12 which is evacuated to a very low absolute pressure. For effective straight vacuum insulation, the outer wall of the vessel 10 and inner wall of the jacket 11 are polished in the customary manner to provide a high resistance to heat transfer when the vacuum in the space 12 is maintained at an extremely high degree. To assist in maintaining the vacuum, a solid adsorbent material is held against the inner vessel by an annular blister 13. The vessel 10 is suitably supported within the jacket 11, preferably by suspension from a neck 14. The neck 14 extends from the upper end of the vessel 10 to a head 15, to which it is gas-tightly secured. The jacket 11 has a similar neck 16 surrounding the neck 14 and which is also secured gas-tightly to the head 15. Means for filling the vessel 10 is preferably provided by a liquid conduit 17 which extends from a point within the inner vessel and through one side of the head 15. The portion of the conduit 17 which passes through the vacuum space between the necks 14 and 16 is formed to provide horizontal coils for liquid trapping purposes. The conduit 17 at a point external of the head 15 is provided with a stop valve 18 to which filling connection 19 is coupled.

Liquid vaporizing means is also provided for vaporizing portions of the liquefied gas at a rate required for use. Such vaporizing means may comprise a heater element 20 supported at the lower end of a stem 21, which is inserted through the neck 14, the stem 21 being suspended from a cap 22, which is gas-tightly but removably secured to the head 15. The heater element is preferably electrically heated and the wires therefor pass through the stem 21 and cap 22 and an electrical conduit 23 to a control switch and source of electric current, which are not shown in the interests of clearness.

Figure 2:
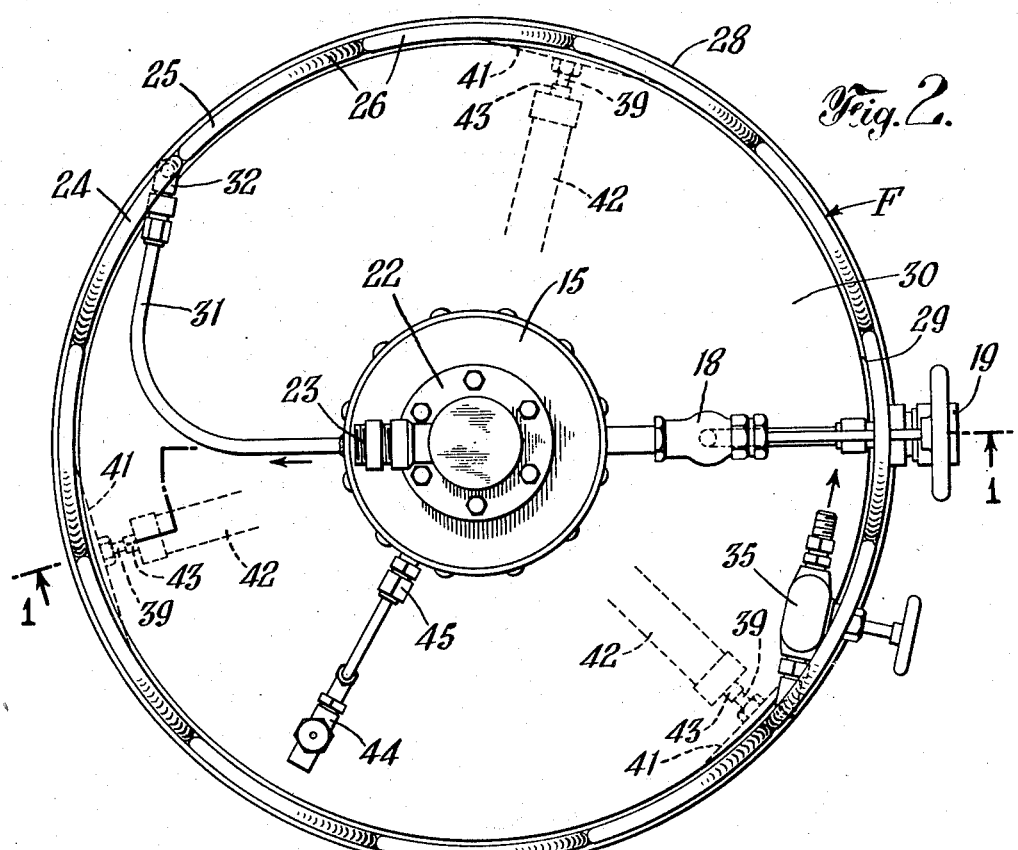
Fig. 2 is a plan view of the apparatus of Fig. 1.
Figure 3:
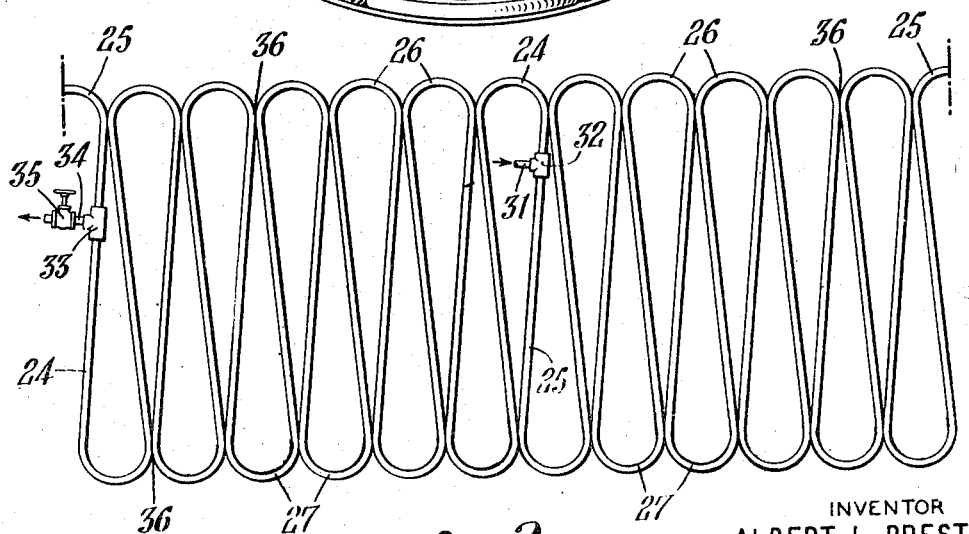
Fig. 3 is a developed view of the superheater and support employed in the apparatus of Figs. 1 and 2.

A supporting frame F for the apparatus is provided which combines the functions of a gas superheater, support, and protective shield and may take various forms. In Figs. 1 to 3 the supporting frame and superheater is formed mainly of two sections of metal tubing 24 and 25, which are bent into vertical hairpin-like loops having upper and lower bends 26 and 27. The superheater conduit is shown laid out in developed form in Fig. 3, but is actually wrapped around the jacket 11 at a small spacing therefrom in the form of a cylinder. The lower bends 27 are all at the same level adjacent to and a short distance below the bottom of the jacket 11 and these bends may be secured to a foot ring 28 by brazing or welding so that the foot ring may provide a means for holding the superheater in cylindrical shape and for securing the container to a floor.

A second ring 29 may be secured to the vertical portions of the tubes 24 and 25 at a point near the lower end of the neck 16, and the head 15 is supported on the ring 29 by a frusto conical member 30. The tubes 24 and 25 of the frame F thus provide the support for the entire container through the conical member 30 and head 15 to which the inner vessel 10 and the outer jacket 11 are independently suspended by the necks 14 and 16.

The vapors produced in the vessel 10 by the heater 20 pass up the neck 14 to an outlet connection 31, which passes through one side of the head 15 and connects to a T 32, the straight run portion of which joins the ends of tubes 24 and 25. The opposite ends of tubes 24 and 25 are joined by another T connection 33, providing a side outlet 34 controlled by a discharge valve 35. The consuming apparatus, such as a distribution system of an airplane and which is not part of the invention, may be coupled to the discharge valve 35. To provide sufficient rigidity, the points of contact between the adjacent loops 26 and the adjacent loops 27 are welded or brazed together as indicated at 36.

In addition to the support provided by the necks 14 and 16 additional support is provided to resist forces due to accelerations in various lateral directions. For this purpose the inner vessel is provided at its bottom with a boss 37 to which are secured three load rods 38 that extend radially outward therefrom. The outer ends of the rods 38 are secured to screws 39 which are fastened by adjusting nuts 40 to brackets 41 that are welded to portions of the loops 27. The outer casing has tubular extensions 42, which surround the rods 38 and are gas-tightly secured at their outer ends 43 to screws 39. In this manner the inner vessel is adequately supported against side sway directly from the superheater frame. The outer jacket is likewise independently and directly supported against side sway by the superheater frame.

The vessel 10 and its jacket 11 are thus maintained in desired spaced relation and both are adequately supported in any position of the apparatus. When the apparatus is to be employed on aircraft, means are provided to prevent the flow of liquid through the neck 14 to the head 15 in any greater quantity than that which may be required to provide the gas being consumed. Such means may be a universal liquid trap arrangement at the inner end of the neck 14, which is not shown herein but which is shown and described in the copending application Serial No. 587,656, filed April 11, 1945, by A. L. Preston and G. H. Zenner, and which has now matured into Patent No. 2,502,588, granted April 4, 1950.

In operation the liquid oxygen is filled into the inner vessel through the connection 19 with the valve 18 open. When the vessel has been charged, the valve 18 is closed and the liquid will be preserved without vaporization for a considerable period of time before normal heat leak thereto will have raised the pressure up to the working pressure or the pressure at which a safety relief valve 44 (Fig. 2), which may be connected to a side outlet 45 of the head 15, is set to open.

When a supply of gas at the working pressure and at substantially atmospheric temperature is required, an electric switch which may be operable by a pressure device supplies current to the heater 20. The vapors produced pass through the neck 14, the connection 31, and through both conduits 24 and 25 to the supply outlet 35. During passage through the tubes 24 and 25 the vapor is superheated by heat absorbed from the atmosphere so that the final temperature reached is not materially different from atmospheric temperature and the gas is at a suitable temperature for breathing purposes. If the demand for gas stops, the heater 20 is automatically shut off and heat leak through the insulation space 12 at a very low rate vaporizes additional quantities of liquid very slowly so that the loss of gas by venting through the safety valve 44 will be relatively small. Since the load rods 38 are long and thin and preferably made of a metal having a high strength and low heat conductivity, the flow of heat through the rods 38 to the inner vessel is immaterial in amount. Similarly the flow of heat through the metal of the neck 14 is small. It will be seen that the superheater tubes 24 and 25 function not only as a superheater but as the main supporting members of the frame for the apparatus and likewise as a protective shield for the jacket 11. The total weight of the apparatus is therefore small for a given capacity of liquid space, and the apparatus is particularly suitable for use in aircraft.

The tubular superheater frame members may be constructed in various forms, for example, instead of two tubes a single tube may be employed to produce a support similar to that shown in Figs. 1 to 3. As illustrated in the embodiment of Fig. 4 the frame members may be formed of a greater number of tubes 46, manifolded together at 47 and 48. The illustration is a developed view similar to Fig. 3, and to form the supporting frame, the tubes 46, having a suitable number of loops, would be wrapped around and secured to frame rings 28 and 29, the manifolds 47 and 48 being connected respectively to connection 31 and supply outlet 35. The tubing could also be wound helically as well as longitudinally to create a basketlike effect, which would provide excellent protection for the jacket 11.

The frame embodiment shown in Figs. 5 and 6 comprises an inner cylindrical sleeve 50 made of shaped metal of suitable thickness and an outer cylindrical sleeve 51 fitted tightly around the inner sleeve 50. The edges of the sleeves 50 and 51 are sealed together by welding at both ends. Pressed into one of the sleeves, preferably the outer sleeve 51, is a channel 52 which forms a gas passage. The channel is formed by pressing the metal outwardly along a suitable path such as the longitudinally serpentine path shown. Short circuiting of the gas from one part of the channel 52 to another between the sleeves 50 and 51 is prevented, preferably by sealing means, such for example as continuous spot welding along both edges of the channel between the sleeves 50 and 51. The beginning 53 and end 54 of the channel communicate with connections 55 and 56 which may be formed through the inner sleeve. At the lower edge of the sleeves a foot ring 57 may be provided and at suitable points holes 58 are provided to receive the screws 39. As indicated in Fig. 1 the head 15 will be connected to the inner sleeve 50 by a suitable conical member similar to member 30. Connection 55 would be joined to connection 31 (Fig. 1) which may pass through a hole in the cone 30, and connection 56 would be joined to supply outlet 35. It is also contemplated that the channel 52 could be embossed into the inner sleeve 50 if a smooth external surface is desired or that both sleeves can be embossed to provide a channel 52 of full round cross-section. Furthermore if desired, the channel could be formed helically instead of in serpentine style.

The invention is not limited to the exact details of construction disclosed herein and it will now be apparent that certain features of the invention may be used independently of others and that changes may be made in various features without departing from the principles of the invention.

1. A gas dispensing apparatus which comprises an inner vessel adapted for holding a body of liquefied gas, such as oxygen; an insulating means surrounding said inner vessel; means in said vessel for controllably vaporizing portions of said liquefied gas as required; and means for superheating the vapors including passage means having an inlet connected to said inner vessel to communicate with the gas space thereof and an outlet to a service connection, said superheating means being exposed to the atmosphere and comprising a protective frame including said passage means, said frame substantially surrounding said insulating means and having a portion extending below said insulating means to form a support for the apparatus; and means for supporting said insulating means and inner vessel on said frame.

2. A gas dispensing apparatus according to claim 1, in which said passage means includes tubular members in the form of elongated loops which are mainly vertical.

3. A gas dispensing apparatus according to claim 1, in which said passage means includes a plurality of tubes connected in parallel, said tubes being arranged in the form of elongated loops which are mainly vertical.

4. A gas dispensing apparatus according to claim 1, in which said superheating and protecting frame means comprises a vertical cylindrical walled member having a gas conduit formed in its wall constituting said passage means.

5. A gas dispensing apparatus which comprises an inner vessel adapted for holding a body of liquid gas, such as oxygen; an insulating jacket surrounding said inner vessel; means in said vessel for controllably vaporizing portions of said liquid gas as required; an upper head to which both the inner vessel and the insulating jacket are hermetically sealed, said inner vessel and said jacket being suspended from said head; a superheater having an inlet connected to the gas space of said inner vessel and an outlet adapted for connection to consuming devices, said superheater comprising a frame including looped conduit portions surrounding said jacket and exposed to the atmosphere, the loops being vertically elongated and the lower bends of the loops being adjacent the bottom of the jacket; a supporting ring secured to the lower bends; and supporting means secured between said head and the looped conduit portions so that the head, jacket and inner vessel are supported and protected by the superheater.

6. A gas dispensing apparatus according to claim 5, which includes at least three radially spaced side sway control members secured at their inner ends to the bottom of the inner vessel and at their outer ends to said superheater; and tubular extensions of said jacket disposed about said control members.

7. A gas dispensing apparatus which comprises an inner vessel for holding liquefied gas at low temperature, said vessel having a neck; a vacuum insulating jacket surrounding said inner vessel and having a neck portion around the neck of the inner vessel; a head to which the necks of the inner vessel and jacket are sealed; a supporting frame about said jacket including means for supporting said head, the inner vessel, and jacket; at least three radially spaced sway control rods having inner ends secured to the bottom of the inner vessel and outer ends secured to the supporting frame; and tubular extensions of said jacket extending around said rods, said extensions being secured to said rods to control side sway of said jacket independently of said inner vessel, the outer ends of said extensions being heremetically sealed.

8. A gas dispensing apparatus which comprises a vessel for holding liquefied gas at a low temperature substantially completely surrounded by heat insulating means and said vessel having means associated therewith for vaporizing portions of the liquid to form vapor; and a supporting and protecting frame for said vessel and insulating means, said frame comprising passage means exposed to normal atmospheric temperatures for superheating vapors withdrawn from said vessel, said passage means having an inlet portion communicating with the vapor space of said vessel and an outlet to a service connection, said frame being disposed about said insulating means for protecting the same; and means for supporting said vessel on said frame constructed and arranged to provide support in any position and to reduce conduction of heat from said frame to said vessel to an immaterial amount.

9. A gas dispensing apparatus which comprises an inner vessel for holding a body of liquefied gas, such as oxygen; heat insulating means surrounding said inner vessel; means associated with said inner vessel for vaporizing portions of said liquefied gas; a supporting and protecting frame for supporting said inner vessel and said insulating means, said frame being disposed about said insulating means and including heating conduit means exposed to the atmosphere, said conduit having an outlet to a service connection and an inlet connected to receive gas material from said inner vessel, said frame also having a portion extending below said insulating means to form a support for the apparatus; and means for supporting said inner vessel on said frame constructed and arranged to provide support in any position and reduce conduction of heat from said frame to the inner vessel to an immaterial amount.

ALBERT L. PRESTON.

REFERENCES CITED

The following references are of record in the file of this patent:

UNITED STATES PATENTS

| Number | Name | Date |
|---|---|---|
| 1,863,958 | Wulff | June 21, 1932 |
| 2,385,984 | Hansen | Oct. 2, 1945 |